US012750298B2

(12) United States Patent
Muthiah et al.

(10) Patent No.: US 12,750,298 B2
(45) Date of Patent: Sep. 29, 2026

(54) METHOD, SYSTEM, AND A GUI CLIENT FOR GENERATING A SIMULATION TIMELINE ENCODED PACKETS VIEW

(71) Applicant: HCL America Inc., Sunnyvale, CA (US)

(72) Inventors: Manickam Muthiah, Shrewsbury, MA (US); Nisha Ravichandran, Hudson, MA (US); Razi Abdul Rahim, Willowbrook, IL (US); Gunamani Rajagopal, Chennai (IN)

(73) Assignee: HCL America Inc.

( * ) Notice: Subject to any disclaimer, the term of this patent is extended or adjusted under 35 U.S.C. 154(b) by 686 days.

(21) Appl. No.: 17/851,058

(22) Filed: Jun. 28, 2022

(65) Prior Publication Data

US 2023/0421477 A1 Dec. 28, 2023

(51) Int. Cl.
*H04L 43/55* (2022.01)
*H04L 43/045* (2022.01)
*H04L 43/106* (2022.01)

(52) U.S. Cl.
CPC ............ *H04L 43/55* (2022.05); *H04L 43/045* (2013.01); *H04L 43/106* (2013.01)

(58) Field of Classification Search
CPC ..... H04L 43/55; H04L 43/045; H04L 43/106; H04L 41/22; H04L 43/50; H04L 41/145
See application file for complete search history.

(56) References Cited

U.S. PATENT DOCUMENTS 7,684,970 B2 3/2010 Hooper et al.
7,711,537 B2 5/2010 Bobok et al.
7,831,613 B2 11/2010 Jain et al.
8,869,093 B2 10/2014 Elliott
2005/0288917 A1* 12/2005 Hooper .............. G06F 11/3636 703/21

(Continued)

OTHER PUBLICATIONS

North Chris, Shneiderman Ben, A Taxonomy of Multiple Window Coordination, May 23, 2007T10:04:32Z,May 23, 2007T10:04:32Z,1997,http://hdl.handle.net/1903/5892,134722 bytes,ISR; TR 1997-90,Human-Computer Interaction.

*Primary Examiner* — Joseph E Avellino
*Assistant Examiner* — Adam Joel Cerlanek
(74) *Attorney, Agent, or Firm* — Kendal M. Sheets

(57) ABSTRACT

A method for generating a simulation timeline encoded packets view is disclosed. In some embodiments, the method includes receiving a type string from each of a plurality of simulation testbench components. The method further includes assigning a unique type code to each of the plurality of simulation testbench components based on the type string. The method further includes iteratively receiving from at least one of the plurality of simulation testbench components, a plurality of data strings along with the corresponding assigned unique type code. The method further includes storing each of the plurality of data strings marked with an associated receipt timestamp. The method further includes contemporaneously generating at each iteration, a simulation timeline encoded packets view for each of the plurality of simulation testbench components. The method further includes contemporaneously rendering at each iteration the simulation timeline encoded packets view via a Graphical User Interface (GUI).

16 Claims, 12 Drawing Sheets

(56) References Cited

U.S. PATENT DOCUMENTS

| | | | | |
|---|---|---|---|---|
| 2008/0126058 | A1* | 5/2008 | Jain | G06Q 10/067<br>703/13 |
| 2013/0179855 | A1* | 7/2013 | Elliott | G06F 30/20<br>716/139 |
| 2023/0081333 | A1* | 3/2023 | Menon | H04L 43/12<br>370/242 |

* cited by examiner

600

| Time 602 | Register Write 604 | Interface 1 Driver 606 | Interface 1 Monitor 608 | Interface 2 Driver 610 | Interface 2 Monitor 612 |
|---|---|---|---|---|---|
| 50 ns | ...........................RESET DE-ASSERTION | | | | |
| 100 ns | RA0 | | | | |
| 150 ns | RA1 | | | | |
| 200 ns | RA2 | | | | |
| 250 ns | RA3 | | | | |
| 500 ns | | DA0 | | | |
| 600 ns | | | MA0 | DB0 | |
| 800 ns | | | | DB1 | MB0 |
| 900 ns | | DA1 | | | |
| 1000 ns | | | MA1 | DB2 | MB1 |
| 1050 ns | | DA2 | | | |
| 1150 ns | | DA3 | MA2 | | |
| 1200 ns | | | | | MB2 |
| 1250 ns | | | MA3 | | |
| 1350 ns | | | | DB3 | |
| 1500 ns | | DA4 | | | |
| 1550 ns | | | | | MB3 |
| 1600 ns | | | MA4 | DB4 | |
| 1650 ns | RA4 | | | | |
| 1750 ns | | DA5 | | | |
| 1800 ns | | | | | MB4 |
| 1850 ns | | | MA5 | DB5 | |
| 2050 ns | | DA6 | | DB6 | MB5 |
| 2075 ns | ......PARITY ERROR DETECTED BY INTERFACE1 MONITOR..... | | | | |
| ⋮ | | | | | |
| ⋮ | | | | | |
| 200500 ns | | DA601 | | | |
| 200600 ns | | | MA601 | DB620 | |
| 200750 ns | | DA602 | | | |
| 200800 ns | | | | | MB620 |

A

FIG. 6A

A

| | | | | | |
|---|---|---|---|---|---|
| 200810 ns | ......INTERFACE1 DRIVER HAS RUN OUT OF CREDITS..... | | | | |
| 200850 ns | | | MA602 | DB621 | |
| 201000 ns | | DA603 | | | |
| 201050 ns | RA107 | | | | MB621 |
| 201100 ns | RA108 | | MA603 | | |
| 201150 ns | | | | DB622 | |
| 201250 ns | | DA604 | | | |
| 201350 ns | | DA605 | MA604 | DB623 | MB622 |
| 201450 ns | | | MA605 | | |
| 201500 ns | RA109 | | | | |
| 201550 ns | | | | | MB623 |
| 201600 ns | | | | DB624 | |
| 201750 ns | | | | | |
| 201800 ns | RA110 | | | | MB624 |
| 201850 ns | | | | DB625 | |
| 202000 ns | | | | | |
| 202050 ns | | | | | MB625 |
| 202100 ns | RA111 | | | | |
| 202150 ns | RA112 | | | | |
| 202200 ns | RA113 | | | | |
| 202250 ns | RA114 | | | | |
| 202300 ns | RA115 | | | | |
| 202350 ns | RA116 | | | | |
| 202400 ns | RA117 | | | | |
| 202500 ns | ...............END OF SIMULATION.......... | | | | |
| Time | Register Write | Interface 1 Driver | Interface 1 Monitor | Interface 2 Driver | Interface 2 Monitor |

FIG. 6B

700

| Register Write | |
|---|---|
| Code 702 | Data 704 |
| RA0 | Address: 0xC Data: 0x01020304 |
| RA1 | Address: 0x24 Data: 0x0001000A |
| ⋮ | ⋮ |
| RA117 | Address: 0x10 Data: 0x00010000 |

FIG. 7

800

| Interface 1 Driver | |
|---|---|
| Code 802 | Data 804 |
| DA0 | Header: 0x4000<br>Payload: 0x12345678 |
| DA1 | Header: 0x4004<br>Payload: 0x82848688 |
| ⋮ | ⋮ |
| DA605 | Header: 0x5010<br>Payload: 0x20405555 |

FIG. 8

900

| Interface 1 Monitor | |
|---|---|
| Code 902 | Data 904 |
| MA0 | Header: 0x4000<br>Payload: 0x12345678 |
| MA1 | Header: 0x4004<br>Payload: 0x82848688 |
| ⋮ | ⋮ |
| MA605 | Header: 0x5010<br>Payload: 0x20405555 |

FIG. 9

1000

| Interface 2 Driver | |
|---|---|
| Code 1002 | Data 1004 |
| DB0 | Payload: 0x45A0C0FF12345688 |
| DB1 | Payload: 0xFF90897645321100 |
| ⋮ | ⋮ |
| DB625 | Payload: 0xCA89125691236435 |

FIG. 10

1100

| Interface 2 Monitor | |
|---|---|
| Code 1102 | Data 1104 |
| MB0 | Payload: 0x45A0C0FF12345688 |
| MB1 | Payload: 0xFF90897645321100 |
| ⋮ | ⋮ |
| MB625 | Payload: 0xCA89125691236435 |

FIG. 11

1200

| Time 1202 | Expected Drop Packet 1204 | Expected Stream 8 Output Packet 1206 | Actual Stream 8 Output Packet 1208 | Expected Stream 9 Output Packet 1210 | Actual Stream 9 Output Packet 1212 |
|---|---|---|---|---|---|
| 50 ns | ...........RESET DE-ASSERTION............ | | | | |
| 100 us | | EA0 | | | |
| 105 us | | | | EB0 | |
| 120 us | | EA1 | | | |
| 130 us | | | AA0 | EB1 | |
| 150 us | | | | EB2 | |
| 200 us | | EA2 | | | |
| 220 us | | | | | AB0 |
| 230 us | | | | EB3 | |
| 235 us | | | AA1 | | |
| 250 us | | EA3 | | | AB1 |
| 260 us | | | | | |
| 265 us | | | | EB4 | |
| 280 us | ZA0 | | | | AB2 |
| 290 us | | | AA2 | | |
| 300 us | | EA4 | | | |
| 305 us | | | | EB5 | AB3 |
| 310 us | | | | | |
| 315 us | | | AA3 | | |
| 335 us | | | | EB6 | |
| 350 us | | EA5 | | | AB4 |
| 350 us | .......ACTUAL STREAM9 OUTPUT DATA ERROR DETECTED....... | | | | |
| 365 us | | | | | |
| 400 us | ZA1 | | | | |

FIG. 12

1300

| Expected Drop Packet | |
|---|---|
| Code 1302 | Data 1304 |
| ZA0 | Payload: 0x45A0C0FF CRC: 0101 |
| ZA1 | Payload: 0xFF908976 CRC:2345 |
| ⋮ | ⋮ |

FIG. 13

1400

| Expected Stream 8 Output Packet | |
|---|---|
| Code 1402 | Data 1404 |
| EA0 | Header: 0x8080<br>Payload: 0x12345678 |
| EA1 | Header: 0x8080<br>Payload: 0x98765432 |
| ⋮ | ⋮ |

FIG. 14

1500

| Actual Stream 8 Output Packet | |
|---|---|
| Code 1502 | Data 1504 |
| AA0 | Header: 0x8080<br>Payload: 0x12345678 |
| AA1 | Header: 0x8080<br>Payload: 0x98765432 |
| ⋮ | ⋮ |

FIG. 15

1600

| Expected Stream 9 Output Packet | |
|---|---|
| Code 1602 | Data 1604 |
| EB0 | Header: 0x8090<br>Payload: 0x01019876 |
| EB1 | Header: 0x8090<br>Payload: 0xABCDE0010 |
| ⋮ | ⋮ |

FIG. 16

1700

| Actual Stream 9 Output Packet | |
|---|---|
| Code 1702 | Data 1704 |
| AB0 | Header: 0x8090<br>Payload: 0x01019876 |
| AB1 | Header: 0x8090<br>Payload: 0xABCDE0010 |
| ⋮ | ⋮ |

FIG. 17

METHOD, SYSTEM, AND A GUI CLIENT FOR GENERATING A SIMULATION TIMELINE ENCODED PACKETS VIEW

TECHNICAL FIELD

Generally, the invention relates to analysis of pre-silicon simulation results. More specifically, the invention relates to method, system, and a Graphical User Interface (GUI) client for generating a simulation timeline encoded packets view.

BACKGROUND

Pre-Silicon simulation is a process of execution of a model, represented by a computer program that provides information about the system under investigation. As opposed to an analytical approach for analyzing the model that is purely theoretical, the analysis of the model via the simulation technique is more reliable as it is more flexible and convenient. In order to analyze the system via the simulation technique multiple simulation testbench components are used.

In a scenario, when a Device Under Test (DUT) (or a System Under Test (SUT)) has multiple input and output interfaces and uses multiple streams that enter or exit the DUT via a single interface, in such a scenario getting a bigger picture of a stimuli, scoreboard expectations, and outputs might become time consuming with the usage of traditional logs, transcripts, or waveforms. Similarly, in order to perform analysis of simulation results, simulation failures, and simulation testbench components (testbench components) activities by using traditional logs, transcripts or waveform might not be always efficient.

Therefore, there is a need of implementing an efficient and reliable technique for generating a simulation timeline encoded packets view for analyzing simulation results.

SUMMARY OF INVENTION

In one embodiment, a method for generating a simulation timeline encoded packets view is disclosed. The method may include receiving a type string from each of a plurality of simulation testbench components. It should be noted that, the type string corresponds to a simulation testbench component from a plurality of simulation testbench components and a packet type from a plurality of packet types. The method may include assigning one or more unique type codes to each of the plurality of simulation testbench components based on one or more type strings received from the respective simulation testbench component. The method may include iteratively receiving from at least one of the plurality of simulation testbench components, a plurality of data strings along with the corresponding assigned unique type code. It should be noted that, each of the plurality of data strings correspond to a packet and a packet type from the plurality of packet types. The method may include storing each of the plurality of data strings marked with an associated receipt timestamp. The method may include contemporaneously generating at each iteration a simulation timeline encoded packets view for each of the plurality of simulation testbench components based on the plurality of data strings, the marked receipt timestamps, and the assigned unique type codes. The method may include contemporaneously rendering at each iteration the simulation timeline encoded packets view via a Graphical User Interface (GUI).

In another embodiment, a graphical user interface (GUI) client for generating a simulation timeline encoded packets view is disclosed. The disclosed GUI client may be configured to receive a request from a user to render the simulation timeline encoded packets view for a simulation. It should be noted that, the simulation timeline encoded packet view may include each of a plurality of simulation testbench components, a plurality of data strings received from each of the plurality of simulation testbench components, a marked receipt timestamp, and an assigned unique type code. The GUI client may be configured to process the received request for generating the simulation timeline encoded packets view for the simulation. The GUI client may be configured to contemporaneously render at each iteration to the user, the generated simulation timeline encoded packets view for the simulation.

In yet another embodiment, a system for generating a simulation timeline encoded packets view is disclosed. The system includes a processor and a memory communicatively coupled to the processor. The memory may store processor-executable instructions, which, on execution, may cause the processor to receive a type string from each of a plurality of simulation testbench components. It should be noted that, the type string corresponds to a simulation testbench component from a plurality of simulation testbench components and a packet type from a plurality of packet types. The processor-executable instructions, on execution, may further cause the processor to assign one or more unique type codes to each of the plurality of simulation testbench components based on one or more type strings received from the respective simulation testbench component. The processor-executable instructions, on execution, may further cause the processor to iteratively receive from at least one of the plurality of simulation testbench components, a plurality of data strings along with the corresponding assigned unique type code. It should be noted that, each of the plurality of data strings corresponds to a packet and a packet type from the plurality of packet types. The processor-executable instructions, on execution, may further cause the processor to store each of the plurality of data strings marked with an associated receipt timestamp. The processor-executable instructions, on execution, may further cause the processor to contemporaneously generate at each iteration, a simulation timeline encoded packets view for each of the plurality of simulation testbench components based on the plurality of data strings, the marked receipt timestamps, and the assigned unique type codes. The processor-executable instructions, on execution, may further cause the processor to contemporaneously render at each iteration, the simulation timeline encoded packets view via a Graphical User Interface (GUI).

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIGS. 6A-6B represents a simulation timeline encoded packets view generated on a GUI based on packets received from a plurality of simulation testbench components, in accordance with an exemplary embodiment.

FIGS. 7-11 represent GUIs depicting a code look-up file associated with each of a plurality of simulation testbench components, in accordance with an exemplary embodiment.

FIG. 12 represents a simulation timeline encoded packets view generated on a GUI based on packets received from a single simulation testbench component, for example, Scoreboard/Checker, in accordance with an exemplary embodiment.

FIGS. 13-17 represent GUIs depicting a code look-up file associated with each packet, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
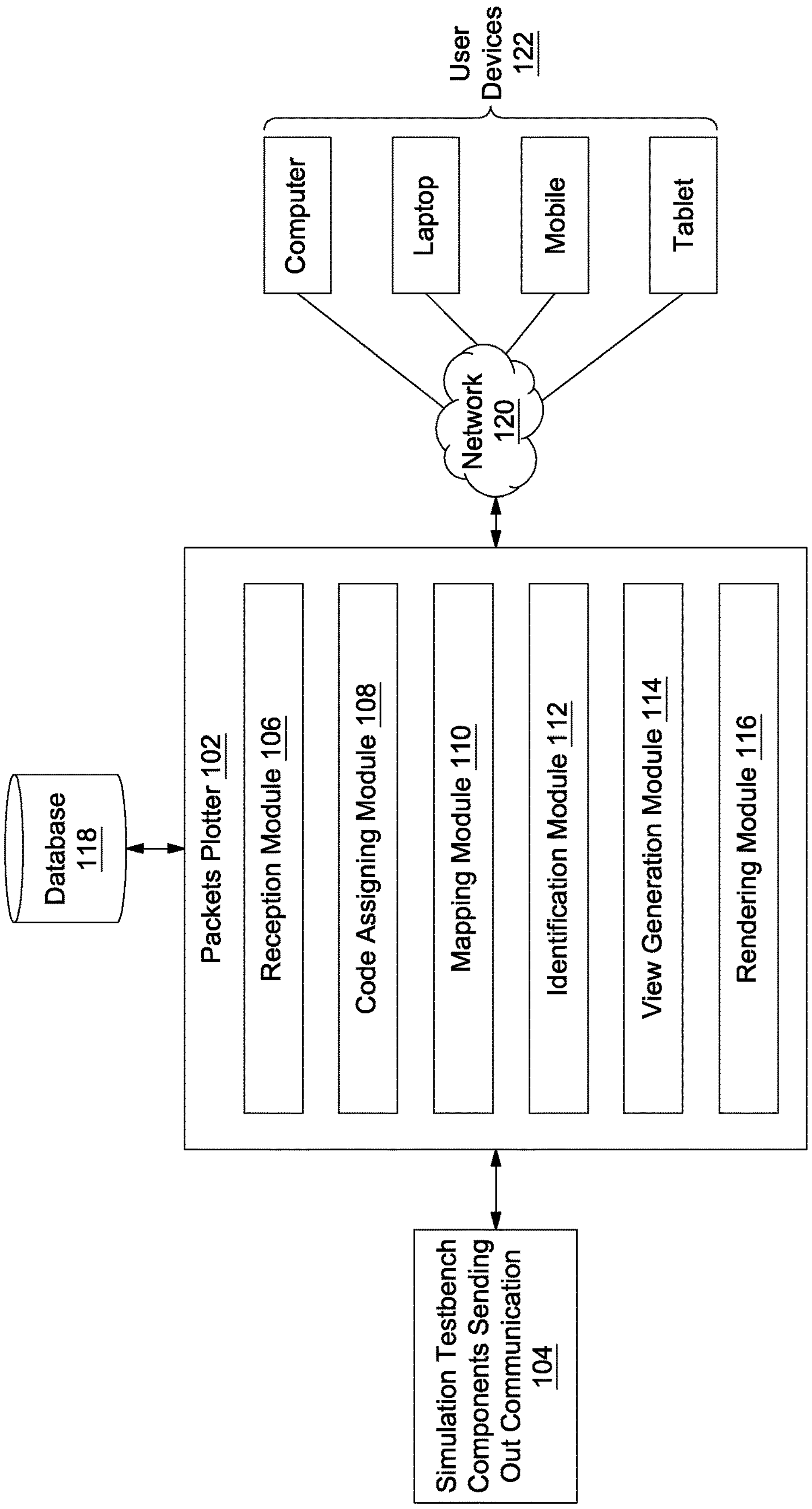
FIG. 1 illustrates a functional diagram of a system configured for generating a simulation timeline encoded packets view, in accordance with an embodiment.

A functional diagram of a system 100 configured for generating a simulation timeline encoded packets view is illustrated in FIG. 1. In order to generate the simulation timeline encoded packets view, the system 100 may include a packets plotter 102. The packets plotter 102 may further include a reception module 106, a code assigning module 108, a mapping module 110, an identification module 112, a view generation module 114, and a rendering module 116. Initially, the reception module 106 may be configured to receive at least one type string from each of a plurality of simulation testbench components. As depicted in current FIG. 1, the plurality of simulation testbench components may correspond to simulation testbench components sending out communication 104. In an embodiment, the at least one type string received may correspond to a simulation testbench component from a plurality of simulation testbench components and a packet type from a plurality of packet types. Moreover, the type string may include, but is not limited to, interface driver, interface monitor, expected stream output packet, actual stream output packet, and expected dropped packet. In other words, the type string received from each of the plurality of simulation testbench components may depict a type of each of the plurality of simulation testbench components. Additionally, the type string received from each of the plurality of simulation testbench components may depict a packet type from a plurality of packet types. Thus, the type string is representative of a simulation testbench component and a type of packet.

In an embodiment, a first data string sent by each of the plurality of simulation testbench components to the packets plotter 102 may be the type string. In other words, each of the plurality of simulation testbench components may send the type string only when a data string is to be sent to the packets plotter 102 for the first time. The reception module 106 may further send the type string received from each of the plurality of simulation testbench components to the code assigning module 108.

Upon receiving the type string, the code assigning module 108 may assign a unique type code for each of the at least one type string received from each of the plurality of simulation testbench components based on the type string thereof. In an embodiment, the unique type code may correspond to at least one of one of the plurality of simulation testbench components and one of the plurality of packet types. Thereafter, the code assigning module 108 may send the at least one assigned unique type code back to each of the plurality of simulation testbench components and to the mapping module 110. The mapping module 110 may be configured to map the at least one assigned unique type code to the associated simulation testbench component from the plurality of simulation testbench components and the corresponding packet type from the plurality of packet types. Once the mapping is done, it may be stored in a database 118. In an embodiment, the at least one assigned unique type code may be stored in an array labeled as 'unique type code per type' by indexing each of the plurality of simulation testbench components using the associated type string. In other words, the 'unique type code per type' array may be used for storing the at least one unique type code for each of the plurality of simulation testbench components using the associated type string.

As will be appreciated, any simulation testbench component from the plurality of simulation testbench components present in a pre-silicon simulation environment (also referred as verification environment/or testbench/or test environment) may send data strings for one or more of the plurality of packet types to the packets plotter 102. Thus, once the unique type codes are assigned and also mapped to each of the plurality of simulation testbench components and packet types, the reception module 106 may iteratively receive a plurality of data strings each with the corresponding assigned unique type code, from at least one of the plurality of simulation testbench components. As with the type string, each of the plurality of data strings may correspond to a packet and a packet type from the plurality of packet types. It may be noted that each of the plurality of data strings may include at least one of a string representation of the associated packet, register address, register data, along with one of the unique type codes assigned to the simulation testbench component that generated the data string from the plurality of data strings.

In addition to iteratively receiving the plurality of data strings each with the corresponding assigned unique type code from the at least one simulation testbench component, the reception module 106 may be configured to receive a critical message from one or more of the plurality of simulation testbench components. In an embodiment, the critical message does not include any unique type code. The critical message may include, but is not limited to at least one of a reset event message, an error event message, a user-defined event message, or an end of simulation event message.

At each iteration, once the reception module 106 receives one or more data strings each with the corresponding assigned unique type code. As discussed before, in addition to the data strings, the reception module 106 may also receive critical messages at one of the iterations. At each such iteration, the identification module 112 fetches each of the one or more data strings to identify the at least one unique type code included therein. The unique type code thus identified enables the identification module 112 to determine the simulation testbench component that generated that data string. Upon identifying the at least one assigned unique type code included in each of the plurality of data strings, the identification module 112 may extract a receipt timestamp associated with each of the plurality of data strings corresponding to each of the at least one unique type code. In an embodiment, the receipt timestamp for a data string from the plurality of data strings may be a timestamp of receiving the data string by the packets plotter 102. In addition to extraction of the receipt timestamp for each of the plurality of data strings, the identification module 112 may fetch each of the critical message from the reception module 106 to identify the receipt timestamp of each critical message. Once all the above stated information is extracted, the mapping module 110 may be configured to create a mapping between each of the plurality of data strings, the associated receipt timestamps, and the one of the unique type codes assigned to a simulation testbench component generating the data string. Upon creating the mapping, the mapping module 110 may store the created mapping and each of the received critical message along with the corresponding receipt timestamp in the database 118. In an embodiment, each of the set of critical messages received from one or more of the plurality of simulation testbench components may be stored using an array labeled as 'critical messages'. The array 'critical messages' may be used for storing each of the set of critical messages received from one or more of the plurality of simulation testbench components. The timestamp of receiving each of the set of critical messages may be stored using an array labeled as 'message time'. The array 'message time' may be used for storing the timestamp of receiving each of the set of critical messages from one or more of the plurality of simulation testbench components. With reference to FIG. 1, the 'critical messages' array depicting the set of critical messages and the 'message time' array depicting the receipt timestamps may be stored in the database 118.

Further, the view generation module 114 may fetch details (i.e., the data string, the associated receipt timestamp, and the at least one unique type code assigned) associated with the simulation testbench components and details of each of the received critical message (i.e., the corresponding receipt timestamp) from the database 118. Based on the fetched details, the view generation module 114 may plot a timeline of transactions corresponding to each of the plurality of simulation testbench components in the simulation timeline encoded packets view, based on the plurality of data strings, the identified unique type codes, and the extracted receipt timestamps. Further, the view generation module 114 may also plot each of the critical message received from one or more of the plurality of simulation testbench components in the simulation timeline encoded packets view.

As discussed before, the simulation timeline encoded packets view may be generated corresponding to at least one of the plurality of simulation testbench components from which the plurality of data strings has been received, and each of the critical message received from one or more of the plurality of simulation testbench components. In an embodiment, at each iteration, i.e., at each time instant when one or more data strings are received, the view generation module 114 may generate the simulation timeline encoded packets view for each of the plurality of simulation testbench components based on the one or more data strings, the marked receipt timestamp for each of these data strings, and the unique type codes assigned to each of the plurality of simulation testbench components. Upon generating the simulation timeline encoded packets view, the view generation module 114 may share the generated simulation timeline encoded packets view to the rendering module 116.

The rendering module 116 may then render the generated simulation timeline encoded packets view to a user via at least one of a plurality of user devices 122. In an embodiment, the rendering module 116 may be configured to contemporaneously rendering at each iteration, i.e., at each time instant when one or more data strings are received, the simulation timeline encoded packets view via a Graphical User Interface (GUI) (also referred as GUI client) of the plurality of user devices 122. Examples of the plurality of user devices 122 may include, but is not limited to, computer, laptop, mobile, and tablet.

As will be appreciated, the user may communicate via each of the plurality of user devices 122 with the view generation module 114 of the packets plotter 102 via a network 120. The network 120, for example, may be any wired or wireless communication network, and the examples may include, but are not limited to, the Internet, Wireless Local Area Network (WLAN), Wi-Fi®, Long Term Evolution (LTE), Worldwide Interoperability for Microwave Access (WiMAX®), and General Packet Radio Service (GPRS). Further, the database 118 may be periodically updated based on new data strings received from one or more of the plurality of simulation testbench components. The database 118 may also be updated based on at least one type string received from a new simulation testbench component that may be added to the simulation. The complete process followed by the system 100 is further explained in detail in conjunction with FIG. 2 to FIG. 7.

Figure 2:
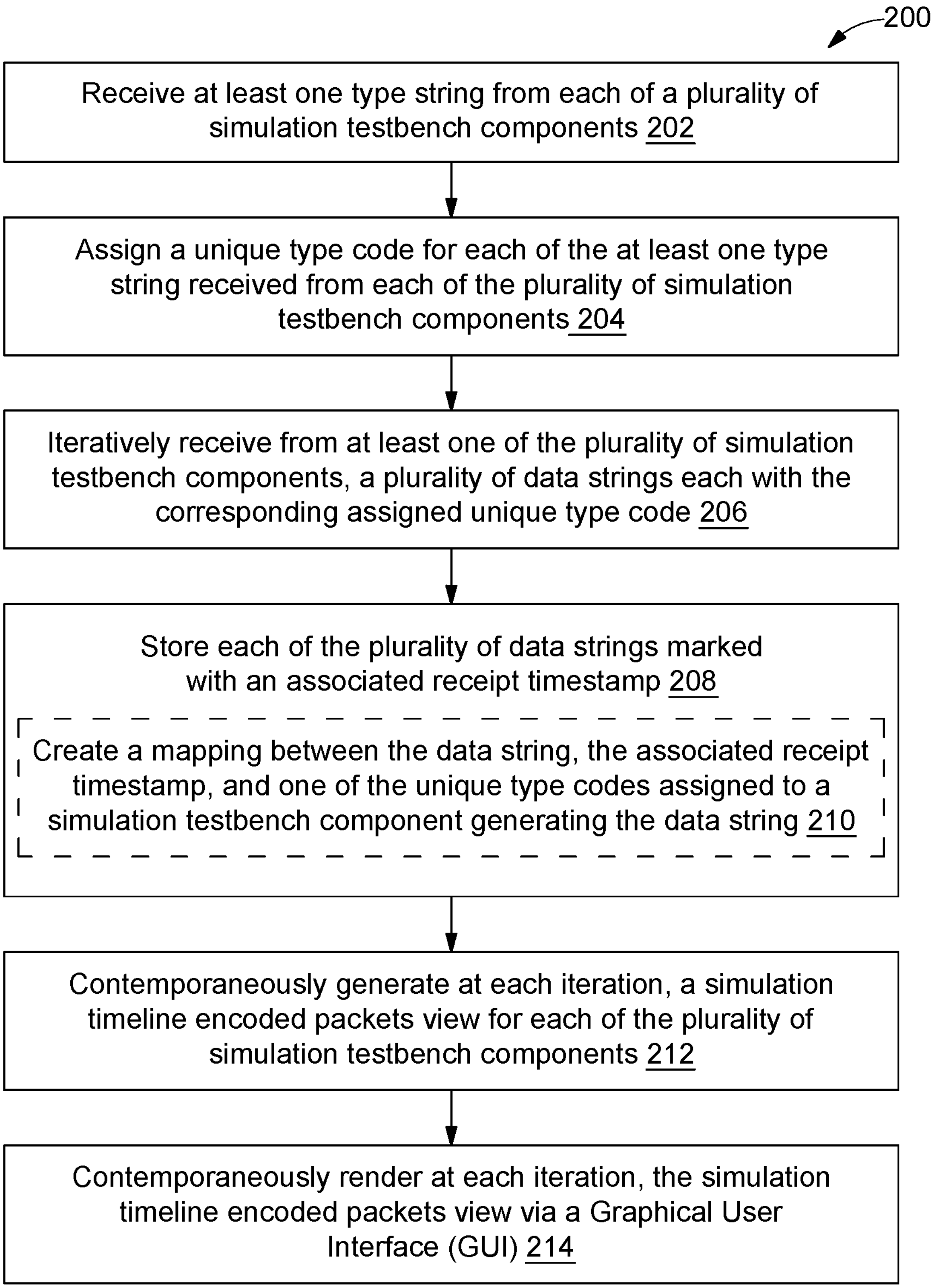
FIG. 2 illustrates a flowchart of a method for generating a simulation timeline encoded packets view, in accordance with an embodiment.

Referring now to FIG. 2, a flowchart of a method 200 for generating a simulation timeline encoded packets view is illustrated, in accordance with an embodiment. At step 202, at least one type string may be received from each of a plurality of simulation testbench components. In an embodiment, the type string may correspond to a simulation testbench component from a plurality of simulation testbench components and a packet type from a plurality of packet types. The type string may include, but is not limited to interface driver, interface monitor, expected stream output packet, actual stream output packet, and expected dropped packet. Upon receiving the at least one type string, at step 204, a unique type code may be assigned for each of the at least one type string received from each of the plurality of simulation testbench components. The unique type code may correspond to at least one of the plurality of simulation testbench components and one of the plurality of packet types. In an embodiment, the unique type code may be assigned to a simulation testbench component based on the at least one type string received from that simulation testbench component. The unique type code may also be assigned based on a particular type of packet sent by the simulation testbench component. A method for mapping an assigned unique type code to an associated simulation testbench component is further explained in detail in conjunction with FIG. 3.

Once the unique type code is assigned to each of the plurality of simulation testbench components, at step 206, a plurality of data strings each with the corresponding assigned unique type code may be received from one or more of the plurality of simulation testbench components. It may be noted that data strings may be received at each iteration, i.e., at each time instance, one or more data strings may be received. In other words, receiving data strings is an iterative process till the simulation is completed. Each of the plurality of data strings may correspond to a packet and a packet type from the plurality of packet types. Further, each of the plurality of data strings may include at least one of a string representation of the associated packet data, register address, register data along with one of the unique type codes assigned to a simulation testbench component from the plurality of simulation testbench components generating the data string from the plurality of data strings.

Upon iteratively receiving the plurality of data strings each with the corresponding assigned unique type code, at step 208, each of the plurality of data strings may be stored. In an embodiment, in order to store each of the plurality of data strings, each of the plurality of data strings may be marked with an associated receipt timestamp and stored thereafter. The associated receipt timestamp for a data string from the plurality of additional data strings may correspond to a timestamp of receiving the data string by a packets plotter. In addition, in order to store a data string, at step 210, a mapping may be created between the data string, the associated receipt timestamp, and one of the unique type code assigned to a simulation testbench component that generated the data string. It will be apparent to a person skilled in the art that the mapping may be performed for each of the plurality of data strings in a similar manner. With reference to FIG. 1, each of the plurality of data strings may be stored in the database 118. In addition, the packets plotter may correspond to the packets plotter 102. In an embodiment, the plurality of data strings received from each of the plurality of simulation testbench components may be stored using an array labeled as 'packet data per code' array, such as packet_data_per_code [Unique Code].push_back(data_string). The array 'packet data per code' may be used for storing each of the plurality of data strings received from each of the plurality of simulation testbench components based on the associated unique type code. In an embodiment, each of the plurality of data strings may provide string representation of packet data or register address and data. With reference to FIG. 1, the 'packet data per code' array depicting the plurality of data strings may be stored in the database 118.

Once the plurality of data strings are stored, at step 212, at each iteration, a simulation timeline encoded packets view may be contemporaneously generated for each of the plurality of simulation testbench components. In an embodiment, the simulation timeline encoded packets view may be contemporaneously generated based on the plurality of data strings, the marked receipt timestamp, and the assigned unique type codes. In other words, the simulation timeline encoded packets view may be generated on a data string in real-time, as and when the data string is received. Upon generating the simulation timeline encoded packets view, at step 214, at each iteration the simulation timeline encoded packets view may be rendered to a user via a Graphical User Interface (GUI). In other words, the simulation timeline encoded packets view may be rendered to the user via the GUI, as and when the data string is received, in real-time. Thus, the user would be able to ascertain the progress of a simulation in real-time. Additionally, once the simulation has completed, the simulation timeline encoded packets view for all the data strings received from the plurality of simulation testbench components is rendered to the user via the GUI.

With reference to FIG. 1, the simulation timeline encoded packets view may be rendered to the user via the GUI of at least one of the plurality of user devices 122. A method for generating and rendering the simulation timeline encoded packets view has been further explained in detail in conjunction with FIG. 4.

Figure 3:
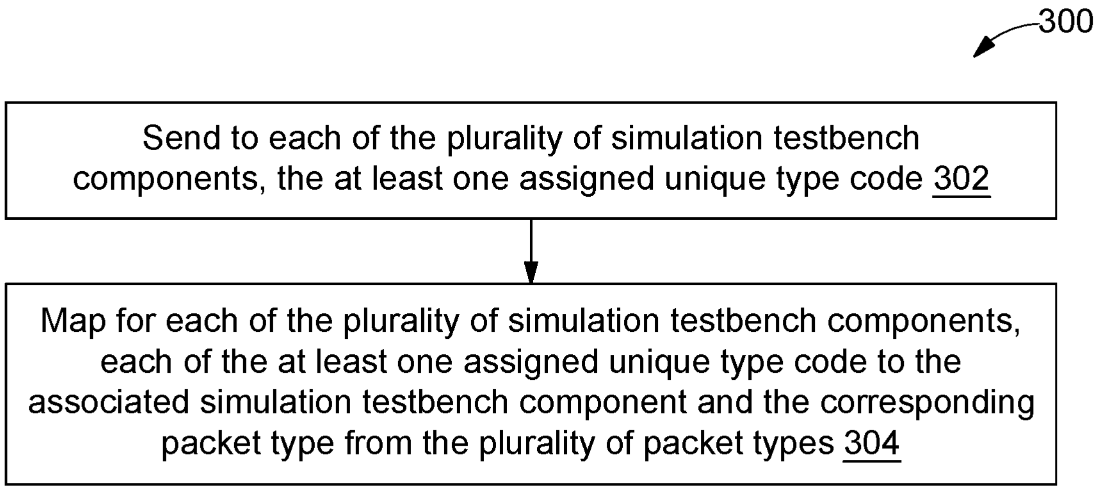
FIG. 3 illustrates a flowchart of a method for mapping an assigned unique type code with an associated simulation testbench component, in accordance with an embodiment.

Referring now to FIG. 3, a flowchart of a method 300 for mapping an assigned unique type code with an associated simulation testbench component is illustrated, in accordance with an embodiment. With reference to FIG. 2, as mentioned via the step 204, the unique type code is assigned for each of the at least one type string received from each of the plurality of simulation testbench components based on the associated type string. Once the unique type codes is assigned for each of the at least one type string, at step 302, the at least one assigned unique type code may be sent to an associated simulation testbench component from the plurality of simulation testbench components. Additionally, at step 304, the at least one assigned unique type code may be mapped to the associated simulation testbench component from the plurality of simulation testbench components and the corresponding packet type from the plurality of packet types. In an embodiment, the steps 302 and 304 may be performed by the packets plotter 102. In other words, the mapping as performed at step 304 may be stored by the packets plotter 102, for example, in the database 112.

Figure 4:
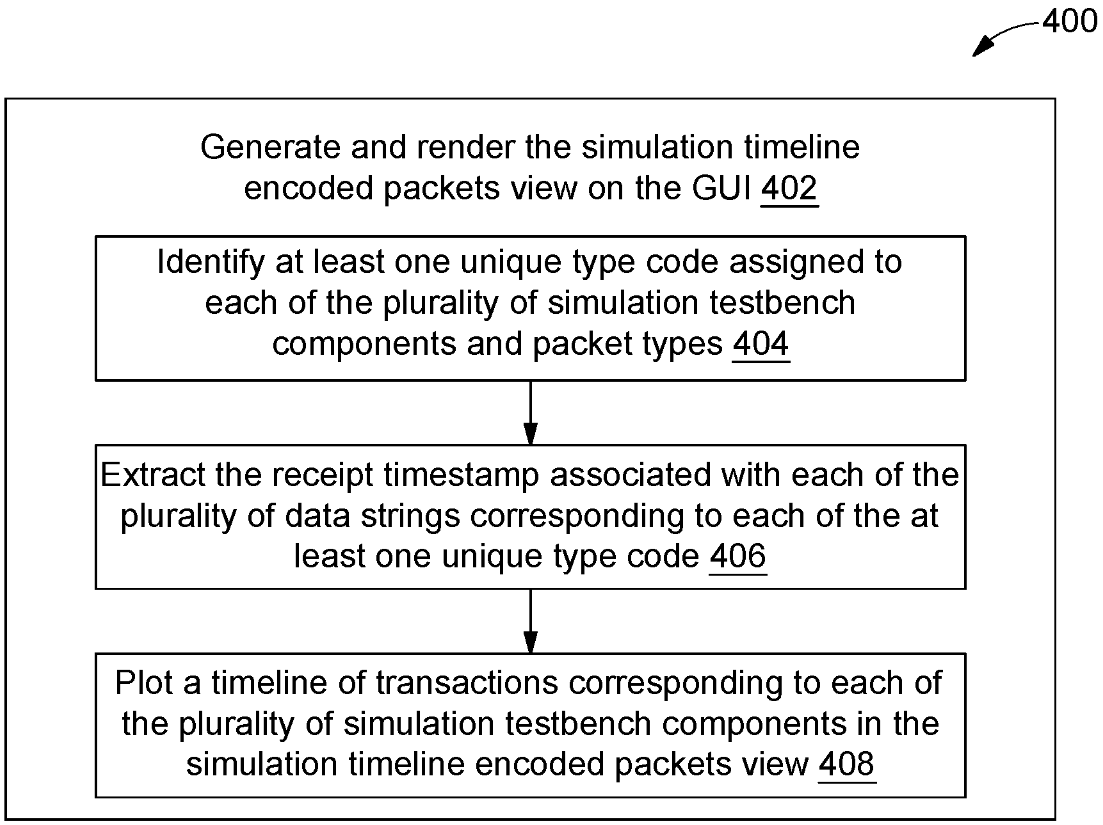
FIG. 4 illustrates a flowchart of a method for generating and rendering a simulation timeline encoded packets view via a GUI client, in accordance with an embodiment.

Referring now to FIG. 4, a flowchart of a method 400 for generating and rendering a simulation timeline encoded packets view via a GUI is illustrated, in accordance with an embodiment. In order to generate and render the simulation timeline encoded packets view on the GUI at step 402, steps 404-408 are executed. The step 402 is already discussed as steps 212 and 214 in the FIG. 2. To further elaborate, before data strings are received from one or more of the plurality of simulation testbench components, the at least one unique type code assigned to each of the plurality of components and various packet types may be identified at step 404. Thereafter, once a plurality of data strings are received, the receipt timestamp associated with each of the plurality of data strings corresponding to each of the at least one unique type code may be extracted at step 406. It will be apparent that the receipt timestamp for a given data string is extracted the moment the data string is received. In an embodiment, the receipt timestamp associated with each of the plurality of data strings may be stored using an array labeled as 'packet time per code', such as pkt_time_per_code [i.e., the unique type code].push_back(timestamp). The array 'packet time per code' may be used for storing the timestamp of receiving each of the plurality of data strings from each of the plurality of simulation testbench components based on the associated unique type code. With reference to FIG. 1, the 'packet time per code' array depicting timestamp of receiving each of the plurality of data strings may be stored in the database 118.

Once the at least one unique type codes assigned to each of the plurality of simulation testbench components and receipt timestamps for each of the received data strings have been identified, at step 408, a timeline of transactions corresponding to each of the plurality of simulation testbench components may be plotted in the simulation timeline encoded packets view. In an embodiment, the plotting of the timeline of transactions corresponding to the plurality of simulation testbench components may be done based on the plurality of data strings, the identified unique type codes, and the extracted receipt timestamps. This has been further explained in detail in conjunction with FIG. 6 to FIG. 17.

Figure 5:
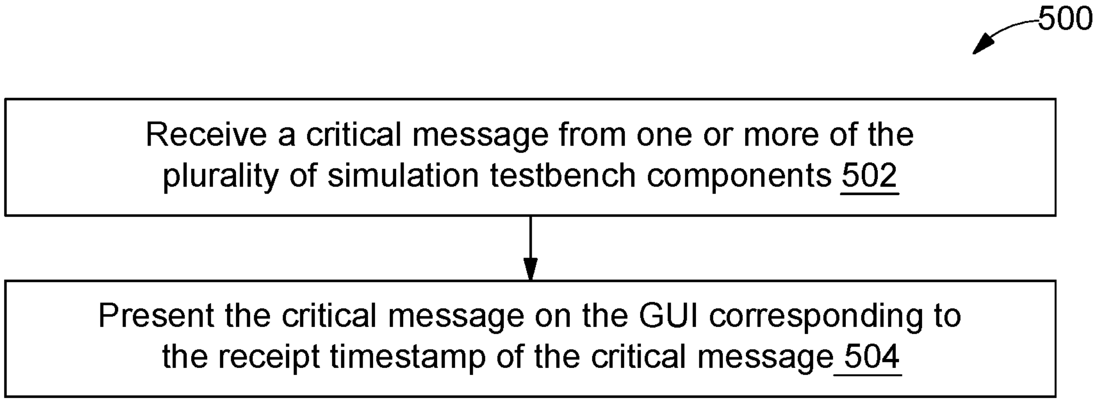
FIG. 5 illustrates a flowchart of a method for presenting a critical message, in accordance with an embodiment.

Referring now to FIG. 5, a flowchart of a method 500 for presenting a critical message is illustrated, in accordance with an embodiment. With reference to FIG. 1, when one or more of the plurality of simulation testbench components 104 may want to send a critical message to the packets plotter 102, a message without the assigned unique type code may be sent to the packets plotter 102. In other words, the critical message does not include any unique type code and the packets plotter 102 is configured to identify any message as the critical message, by detecting absence of a unique type code in the message. The critical message, for example, may include, but is not limited to, at least one of a reset event message, an error event message, a user-defined event message, or an end of simulation event message. In an embodiment, the critical message may be sent without the assigned unique type code in order to differentiate the plurality of data strings associated with each of the plurality of simulation testbench components from the critical message received from one or more of the plurality of simulation testbench components.

At step 502, a critical message may be received from the one or more of the plurality of simulation testbench components. Upon receiving the critical message, at step 504, the critical message may be presented on the GUI corresponding to the receipt timestamp of the critical message. The presented critical message, for example, may clearly indicate on the GUI that an error has occurred during the simulation. It should be noted that, the critical message along with the corresponding receipt timestamp may be rendered via the simulation timeline encoded packets view generated for the simulation.

Referring now to FIG. 6A-6B, a simulation timeline encoded packets view generated on a GUI 600 based on packets received from a plurality of simulation testbench components, in accordance with an exemplary embodiment. In an embodiment, the GUI 600 configured for rendering the simulation timeline encoded packets view may include a table. In the GUI 600, a first column, i.e., time 602, may represent predefined time intervals. At one or more of these time intervals one or more critical messages and one or more data strings may be received from simulation testbench components. Further, in the GUI 600, subsequent columns represent various simulation testbench components and data strings received from these simulation testbench components. A column 604 is for register write, a column 606 is for interface 1 driver, a column 608 is for interface 1 monitor, a column 610 is for interface 2 driver, and a column 612 is for interface 2 monitor.

Once each of these simulation testbench components and packet types have been assigned a unique type code, one or more of the simulation testbench components may send data strings that include unique type codes to the packets plotter 102. The data strings may be received at various time instances and may be plotted in the GUI based on the receipt timestamps, unique type codes and the type strings used by the simulation testbench component sending these data strings respectively. Specifically, with reference to FIGS. 6A and 6B, the unique type code assigned to each of the simulation testbench components, i.e., register write, interface 1 driver, interface 1 monitor, interface 2 driver, and interface 2 monitor may correspond to 'RA', 'DA', 'MA', 'DB', 'MB', respectively. In an embodiment, once each of the simulation testbench components has been assigned the unique type code based on the at least one type string received from each of the simulation testbench components generating the packet, each packet/data string may further be assigned a code in real-time, for example, based on a sequence of receiving these packets by the packets plotter 102. In other words, packets are not pre-assigned a code and these codes are assigned on the fly based on the respective unique type codes. In this case, a code look-up file for each of these packets may also be dynamically generated for the convenience of user reference. In some embodiment, each packet type may also be assigned a code, for example, starting from the number 0 to the total number of different packet types available. For example, if there are 100 different packet types, number 0 to 100 may be assigned to different types of packets. Thus, in this embodiment the combination of codes assigned to simulation testbench component and a packet count in combination may lead to a unique type code. In other words, a unique type code may correspond to or may represent the simulation testbench component and the packet count.

As depicted via the GUI 600, one or more cells in the column 604, i.e., the column for the register write, may depict unique type code included within the data strings received from the respective simulation testbench component and the data string counts/numbering at various time instances. By way of an example, data strings 'RA0', 'RA1', up to 'RA117' are received at different time instances from the associated simulation testbench component. Based on the receipt timestamp for each of these data strings, unique type code and the data string counts/numbering, these are depicted on the GUI 600. In other words, the data strings are represented on the GUI for a given simulation testbench component using merely the unique type code, the data string counts/numbering, and the receipt timestamps. For example, a data string that includes the unique type code 'RA' may be received at '100 nanoseconds (ns)' represented as 'RA0' (first packet), the data string that includes the unique type code 'RA' may be received at '150 ns represented as 'RA1', and another data string that includes the unique type code 'RA' may be received at 202400 ns represented as 'RA117'. Thus, these data strings may be represented on the GUI 600 using the unique type codes RA0, RA1, and RA117 mapped respectively to the times 100 ns, 150 ns, and 202400 ns. In a similar manner, all other data strings received from the respective simulation testbench component are represented on the GUI 600.

Further, one or more cells in the column 606, i.e., the column for the interface 1 driver, may depict unique type code included within the data strings received from respective simulation testbench component and the data string counts/numbering at various time instances. By way of an example, data strings 'DA0', 'DA1', up to 'DA605' are received at different time instances from the interface 1 driver simulation testbench component. Based on the receipt timestamp for each of these data strings, unique type codes, and the data string counts/numbering, these are depicted on the GUI 600. In other words, the data strings are represented on the GUI for a given simulation testbench component using merely the unique type code, the data string counts/numbering, and the receipt timestamps. For example, a data string that includes the unique type code 'DA' may be received at '500 ns' represented as 'DA0', the data string that includes the unique type code 'DA' may be received at '900 ns' represented as 'DA1', and another data string that includes the unique type code 'DA' may be received at '201350 ns' represented as 'DA605'. Thus, these data strings may be represented on the GUI 600 using the unique type codes DA0, DA1, up to DA605 mapped respectively to the times 500 ns, 900 ns, and 201350 ns. In a similar manner, all other data strings received from the respective simulation testbench component are represented on the GUI 600.

In a similar manner, one or more cells in the column 608, i.e., the column for interface 1 monitor may depict unique type code included within the data strings received from respective simulation testbench component and the data string counts/numbering at various time instances, one or more cells in the column 610, i.e., the column for interface 2 driver may depict unique type code included within the data strings received from the respective simulation testbench component and the data string counts/numbering at various time instances, and one or more cells in the column 612, i.e., the column for interface 2 monitor may depict unique type code included within the data strings received from the respective simulation testbench component and the data string counts/numbering at various time instances.

As depicted via the GUI 600, the cells mapped to time instances at which no data string is received from any of the simulation testbench components remain empty. In addition to providing the representation of the plurality of data strings received from the simulation testbench components, the GUI 600 may also provide representation of a set of critical messages based on a timestamp of receiving each of the set of critical messages for the simulation.

In the GUI 600, the set of critical messages are depicted adjacent to time instance when these critical messages were received, based on the respective receipt timestamps. For example, a reset message is received at a time instance of '50 ns', a message of detection of parity error by the interface 1 monitor simulation testbench component is received at a time instance of '2075 ns', a message on running out of credits from the interface 1 driver is received at a time instance of '200810 ns', and a message on simulation ending is received at a time instance of '202500 ns'.

As depicted via the GUI 600, the simulation timeline encoded packets view may provide representation of each of the plurality of simulation testbench components, the plurality of data strings received from each of the plurality of simulation testbench components, the set of critical messages in a chronological order along with the associated timestamps. This simulation timeline encoded packets view provided to the user may enable user to understand activities of the simulation testbench components in a testbench/test environment, reasonably faster. Moreover, the simulation timeline encoded packets view might be used by the user in conjunction with a codes look-up file (also referred as a code 2 packet mapper log files), while locating a packet of interest. Therefore, the simulation timeline encoded packets view may save considerable amount of simulation results analysis time. In reference to FIG. 1, the packets plotter 102 may generate the code look-up file for each of the plurality of simulation testbench components based on the type string, the unique type code, and the plurality of data strings associated with each of the plurality of simulation testbench components.

Referring now to FIG. 7-FIG. 11, GUIs depicting a code look-up file associated with each of a plurality of simulation testbench components is represented, in accordance with an exemplary embodiment. As will be appreciated FIG. 7 to FIG. 11 are explained with reference to the GUI 600. In FIG. 7, a code look-up file for the simulation testbench component that performs register write is represented via a GUI 700. In the GUI 700, the first row may represent name or function of the simulation testbench component, i.e., the register write. The GUI 700 may further be bifurcated into two columns, i.e., a column 702 to list down unique type code assigned to this respective simulation testbench component and the data string counts/numbering, and a column 704 to list down data represented by each of these unique type codes. The data represented by each unique type code may include address and data included in each of the plurality of data strings received from this respective simulation testbench component.

In FIG. 8, a code look-up file for the interface 1 driver simulation testbench component is represented via a GUI 800. In the GUI 800, the first row may represent name or function of the simulation testbench component, i.e., 'the interface 1 driver'. The GUI 800 may further be bifurcated into two columns, i.e., a column 802 to list down unique type code assigned to this respective simulation testbench component and the data string count/numbering, and a column 804 to list down data represented by each of these unique type codes. The data represented by each unique type code may include address and data included in each of the plurality of data strings received from this respective simulation testbench component.

In FIG. 9, a code look-up file for the interface 1 monitor simulation testbench component is represented via a GUI 900. In the GUI 900, the first row may represent name or function of the simulation testbench component, i.e., the interface 1 monitor. The GUI 900 may further be bifurcated into two columns, i.e., a column 902 to list down unique type code assigned to this respective simulation testbench component and the data string count/numbering, and a column 904 to list down data represented by each of these unique type codes. The data represented by each unique type code may include address and data included in each of the plurality of data strings received from this respective simulation testbench component.

In FIG. 10, a code look-up file for the interface 2 driver simulation testbench component is represented via a GUI 1000. In the GUI1000, the first row may represent name or function of the simulation testbench component, i.e., the interface 2 driver. The GUI 1000 may further be bifurcated into two columns, i.e., a column 1002 to list down unique type code assigned to this respective simulation testbench component and the data string count/numbering, and a column 1004 to list down data represented by each of these unique type codes. The data represented by each unique type code may include address and data included in each of the plurality of data strings received from this respective simulation testbench component.

In FIG. 11, a code look-up file for the interface 2 monitor simulation testbench component is represented via a GUI 1100. In the GUI 1100, the first row may represent name or function of the simulation testbench component, i.e., 'the interface 2 monitor'. The GUI 1100 may further be bifurcated into two columns, i.e., a column 1102 to list down unique type code assigned to this respective simulation testbench component and the packet count/numbering, and a column 1104 to list down data represented by each of these unique type codes. The data represented by each unique type code may include address and data included in each of the plurality of data strings received from this respective simulation testbench component.

Referring now to FIG. 12, a simulation timeline encoded packets view generated on a GUI 1200 based on packets received from a single simulation testbench component is represented, in accordance with an exemplary embodiment. In an embodiment, the GUI 1200 configured for rendering the simulation timeline encoded packets view may include a table. By way of an example, the single simulation testbench component from which the packets are received may correspond to a Scoreboard/Checker. The scoreboard may want to plot packets as they are received. In an embodiment, each of the packets that needs to be plotted may correspond to one of the plurality of packet types.

In order to plot the set of packets, initially, the scoreboard may send a type string. The type string may represent a packet type associated with each of the set of packets that the scoreboard wants to plot. In the GUI 1200, a first column, i.e., 'time 1202' may represent pre-defined time intervals. At one of these time intervals, one or more critical messages and one or more packets may be received. Further, in the GUI 1200, subsequent columns represent various packet types and their representation in the form of unique type code corresponding to the time instances at which these are received. A column 1204 is for expected drop packet, a column 1206 is for expected stream 8 output packet, a column 1208 is for actual stream 8 output packet, a column 1210 is for expected stream 9 output packet, and a column 1212 is for actual stream 9 output packet.

Once each packet type has been assigned a unique type code, these unique type codes may be used by the scoreboard (simulation testbench component) to populate the GUI 1200 via the packets plotter 102. The one or more packets may be received at various time instances and may be plotted in the GUI 1200 based on the receipt timestamps, unique type codes, and the packet type that they respectively correspond to. Specifically, with reference to FIG. 12, the packet types include expected drop packet, expected stream 8 output packet, actual stream 8 output packet, expected stream 9 output packet, and actual stream 9 output packet and the unique type code assigned to each of these packet types may correspond to 'ZA', 'EA', 'AA', 'EB', and 'AB', respectively. In this case, the numeral used along with the unique type code may represent the sequence in which the packet was received.

As depicted via the GUI 1200, one or more cells in the column 1204, i.e., the column for the expected drop packet, may depict unique type code representing packets of the relevant type and packet count/numbering received at various time instances. By way of an example, 'ZA0' and 'ZA1' represent expected drop packets that are received at different time instances. Thus, expected drop packets are represented on the GUI 1200 using merely the unique type code and the packet count/numbering allocated therein. For example, the packet (first packet) that includes the unique type code 'ZA' may be received at 280 microsecond (us) represented as 'ZA', while the packet that includes the unique type code 'ZA' may be received at 400 us represented as 'ZA1'. Thus, these packets 'ZA0' and 'ZA1' are represented on the GUI 1200 using the unique type code and the packet count/numbering mapped respectively to the times 280 us and 400 us.

Further, one or more cells in the column 1206, i.e., the column for the expected stream 8 output packet, may depict unique type code representing packets of the relevant type and packet count/numbering received at various time instances. By way of an example, EA0, EA1, and EA2 represent expected stream 8 output packets that are received at different time instances. For example, the packet that includes the unique type code 'CEA' may be received at 100 us represented as 'EA0', the packet that includes the unique type code 'EA' may be received at 120 us represented as 'EA1', and the packet that includes the unique type code 'EA' may be received at 350 us represented as 'EA5'. Thus, these packets EA0, EA1, EA5 may be represented on the GUI 1200 using the unique type code and the packet count/numbering mapped respectively to the time instances 100 us, 120 us, and 350 us.

In a similar manner, one or more cells in the column 1208, i.e., the column for the actual stream 8 output packet, may depict unique type code representing packets of the relevant type and packet count/numbering received at various time instances, one or more cells in the column 1210, i.e., the column for the expected stream 9 output packet, may depict unique type code representing packets of the relevant type and packet count/numbering received at various time instances, and one or more cells in the column 1212, i.e., the column for the actual stream 9 output packet, may depict unique type code representing packets of the relevant type and packet count/numbering received at various time instances.

As depicted via the GUI 1200, the cells mapped to time instances at which no packets are received, remain empty. In addition to providing the representation of the packets, the GUI 1200 may also provide representation of a set of critical messages based on a timestamp of receiving each of the set of critical messages during the simulation.

In the GUI 1200, the set of critical messages are depicted adjacent to time instance when these critical messages were received, based on the respective receipt timestamps. For example, a reset de-assertion message is received at a time instance of '50 ns', and a message of detecting actual stream 9 output data error is received at a time instance of 350 us.

As depicted via the GUI1200, the simulation timeline encoded packets view may provide representation of various packets and each of the set of critical message in a chronological order along with the associated receipt timestamp. The simulation timeline encoded packets view rendered to the user via the GUI 1200 may enable the user to understand activities of the simulation reasonably faster. Additionally, the simulation timeline encoded packets view may save considerable amount of simulation results analysis time. Moreover, the simulation timeline encoded packets view might be used by the user in conjunction with a codes look-up file (also referred as a code 2 packet mapper log files), while locating a packet of interest. The code look-up file associated with each of the set of packets has been depicted via FIG. 13 to FIG. 17.

Referring now to FIGS. 13-17, GUIs depicting a code look-up file associated with each packet is represented, in accordance with an exemplary embodiment. As will be appreciated, the FIGS. 13-FIG. 17 are explained in reference to the GUI 1200. In FIG. 13, a code look-up file for the expected drop packets is represented via a GUI 1300. In the GUI1300, the first row may represent name or function of the packet type, i.e., 'the expected drop packet'. The GUI 1300 may further be bifurcated into two columns, i.e., a column 1302 to list down unique type code assigned to the expected drop packets and the packet count/numbering, and a column 1304 to list down data represented by each of these unique type codes. The data represented by each unique type code may include payload and Cyclic Redundancy Check (CRC) included in each of the expected drop packets.

In FIG. 14, a code look-up file for the expected stream 8 output packets is represented via a GUI 1400. In the GUI1400, the first row may represent name or function of the packet type, i.e., 'the expected stream 8 output packet'. The GUI 1400 may further be bifurcated into two columns, i.e., a column 1402 to list down unique type code assigned to the expected stream 8 output packets and the packet count/numbering and a column 1404 to list down data represented by each of these unique type codes. The data represented by each unique type code may include header and payload associated with each of the expected stream 8 output packets.

In FIG. 15, a code look-up file for the actual stream 8 output packets is represented via a GUI 1500. In the GUI 1500, the first row may represent name or function of the packet type, i.e., 'the actual stream 8 output packet'. The GUI 1500 may further be bifurcated into two columns, i.e., a column 1502 to list down unique type code assigned to the actual stream 8 output packets and the packet count/numbering, and a column 1504 to list down data represented by each of these unique type codes. The data represented by each unique type code may include header and payload associated with each of the actual stream 8 output packets.

In FIG. 16, a code look-up file for the expected stream 9 output packets is represented via a GUI 1600. In the GUI1600, the first row may represent name or function of the packet type, i.e., 'the expected stream 9 output packet'. The GUI 1600 may further be bifurcated into two columns, i.e., a column 1602 to list down unique type code assigned to the expected stream 9 output packets and the packet count/numbering and a column 1604 to list down data represented by each of these unique type codes. The data represented by each unique type code may include header and payload associated with each of the expected stream 9 output packets.

In FIG. 17, a code look-up file for the actual stream 9 output packets is represented via a GUI1700. In the GUI1700, the first row may represent name or function of the packet type, i.e., 'the actual stream 9 output packet'. The GUI 1700 may further be bifurcated into two columns, i.e., a column 1702 to list down unique type code assigned to the actual stream 9 output packets and the packet count/numbering, and a column 1704 to list down data represented by each of these unique type codes. The data represented by each unique type code may include header and payload associated with each of the actual stream 9 output packets.

Figure 18:
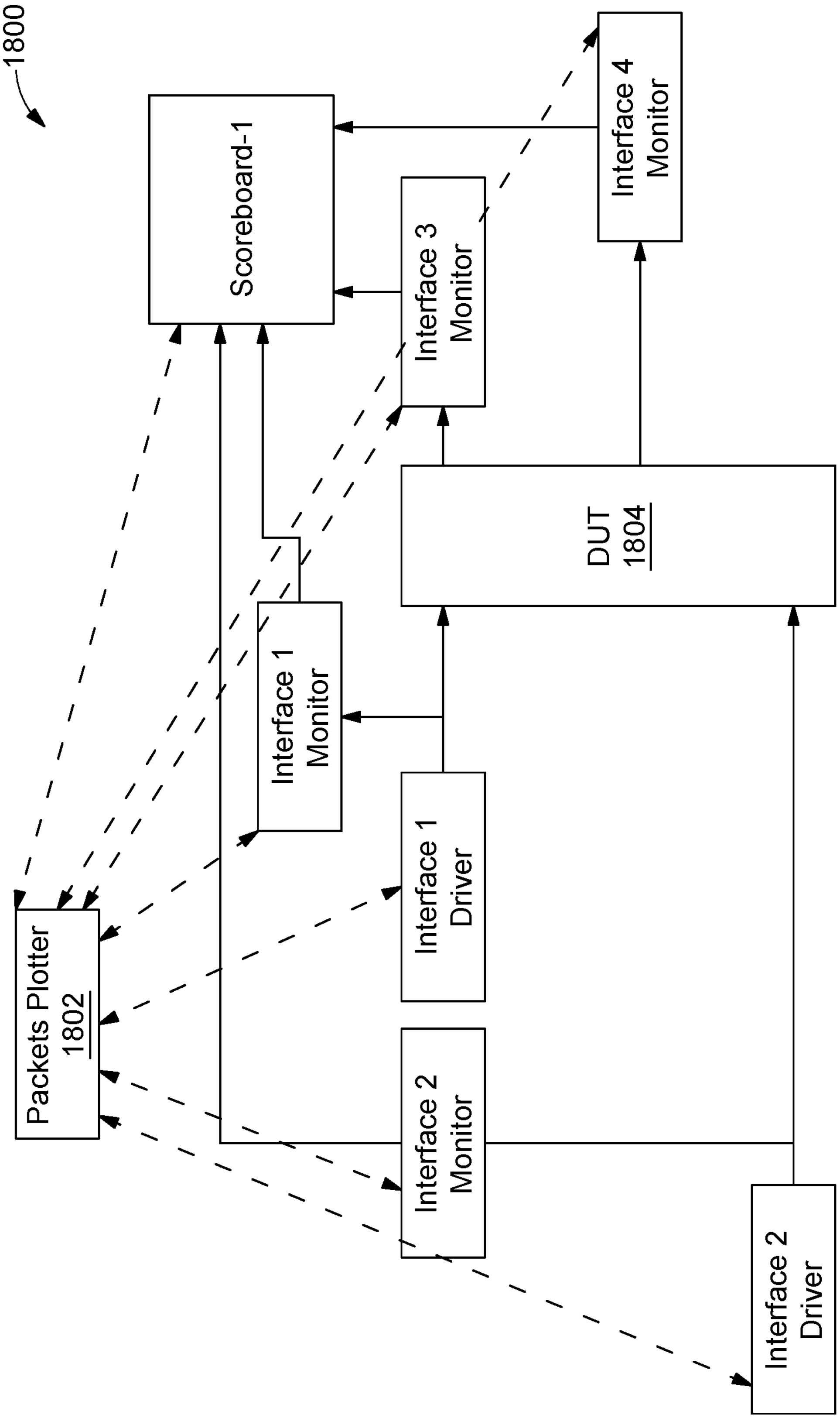
FIG. 18 illustrates an exemplary test environment for generating a simulation timeline encoded packets view, in accordance with an embodiment.

Referring now to FIG. 18, an exemplary test environment 1800 for generating a simulation timeline encoded packets view illustrated, in accordance with an embodiment. In reference to FIG. 1, the packets plotter 1802 may correspond to the packets plotter 102. The depicted exemplary test environment 1800 may include a Device Under Test (DUT) 1804. Further, the packets plotter 1802 may be configured to generate the simulation timeline encoded packets view based on packets received from a plurality of simulation testbench components. As depicted via the present FIG. 18, the plurality of testbench components may include, an interface 1 driver, an interface 2 driver, an interface 1 monitor, an interface 2 monitor, an interface 3 monitor, an interface 4 monitor and a scoreboard 1. In reference to FIG. 6, the generated simulation timeline encoded packets view may correspond to the simulation timeline encoded packets view generated on the GUI 600.

Various embodiments provide method and system for generating a simulation timeline encoded packets view. The disclosed method and system may receive a type string from each of a plurality of simulation testbench components. The type string may correspond to a packet type from a plurality of packet types. Further, the disclosed method and system may assign a unique type code to each of the plurality of simulation testbench components based on the type string received from each of the set of packets. Moreover, the disclosed method and system may iteratively receive from at least one of the plurality of simulation testbench components, a plurality of data strings along with the corresponding assigned unique type code. Each of the plurality of data strings may correspond to a packet and a packet type from the plurality of packet types. Further, the disclosed method and system may store each of the plurality of data strings marked with an associated receipt timestamp. Thereafter, the disclosed method and system may contemporaneously generate at each iteration a simulation timeline encoded packets view for each of the plurality of simulation testbench components based on the plurality of data strings, the marked receipt timestamps, and the assigned unique type codes. Lastly, the disclosed method and the system may contemporaneously render at each iteration, the simulation timeline encoded packets view via a Graphical User Interface (GUI).

The disclosed method and system may provide some advantages like, the disclosed method and the system may be methodology independent and hence may be used across any of an existing industry standard verification methodology. Further, the disclosed method and the system may provide user an ability to identify each of a set of packets and position of each of the set of packets in a sequence of packets corresponding to each of a plurality of simulation testbench components represented in the simulation timeline encoded packets view. In addition, the disclosed method and the system may provide pictorial representation to the user in order to enable the user to view an error occurred in the simulation and relate timing of the error (if there is an error) with transaction timing of each of the plurality of simulation testbench components (also referred as testbench components). Moreover, the disclosed method and the system may provide pictorial representation to the user in order to enable the user to view critical event (i.e., the critical message) and relate timing of the critical event (for example: reset, driver waiting for credits, Scoreboard (SB) flagging the error, SB dropping the packet) with transactions timing of each of the plurality of simulation testbench components.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating a simulation timeline encoded packets view, the method comprising:

receiving, by a packets plotter, at least one type string from each of a plurality of simulation testbench components, wherein the type string corresponds to a packet type from a plurality of packet types;

assigning, by the packets plotter, a unique type code for each of the at least one type string received from each of the plurality of simulation testbench components based on the type string received from each of plurality of simulation testbench components, wherein the type string comprises interface driver, interface monitor, expected stream output packet, actual stream output packet, and expected dropped packet, and wherein the unique type code corresponds to at least one of:

one of the plurality of simulation testbench components; and one of the plurality of packet types;

iteratively receiving, by the packets plotter, from at least one of the plurality of simulation testbench components, a plurality of data strings each with the corresponding assigned unique type code, wherein each of the plurality of data strings correspond to a packet and a packet type from the plurality of packet types;

receiving, by the packets plotter, a critical message from one or more of the plurality of simulation testbench components, wherein the critical message excludes the associated unique type code, and wherein the critical message comprises at least one of a reset event message, an error event message, a user-defined event message, or an end of simulation event message;

storing, by the packets plotter, each of the plurality of data strings marked with an associated receipt timestamp;

contemporaneously generating at each iteration, by the packets plotter, a simulation timeline encoded packets view for each of the plurality of simulation testbench components based on the plurality of data strings, the marked receipt timestamps, and the assigned unique type codes; and contemporaneously rendering at each iteration, by the packets plotter, the simulation timeline encoded packets view via a Graphical User Interface (GUI).

2. The method of claim 1, wherein a data string from the plurality of data strings comprises at least one of a string representation of the associated packet data, register address, register data along with one of the unique type codes assigned to a simulation testbench component from the plurality of simulation testbench components generating the data string from the plurality of data strings.

3. The method of claim 1, wherein the receipt timestamp for a data string from the plurality of data strings corresponds to a timestamp of receiving the data string by the packets plotter.

4. The method of claim 1, wherein storing a data string from the plurality of data strings comprises:

creating a mapping between the data string, the associated receipt timestamp, and one of the unique type codes assigned to a simulation testbench component generating the data string.

5. The method of claim 4, wherein generating and rendering the simulation timeline encoded packets view on the GUI comprises:

identifying at least one unique type code assigned to each of the plurality of simulation testbench components and packet types;

extracting the receipt timestamp associated with each of the plurality of data strings corresponding to each of the at least one unique type code; and plotting a timeline of transactions corresponding to each of the plurality of simulation testbench components in the simulation timeline encoded packets view, based on the plurality of data strings, the identified unique type codes, and the extracted receipt timestamps.

6. The method of claim 1, wherein rendering the simulation timeline encoded packets view on the GUI comprises:

presenting the critical message on the GUI corresponding to the receipt timestamp of the critical message.

7. The method of claim 1, further comprising:

sending to each of the plurality of simulation testbench components, at least one assigned unique type code; and mapping, for each of the plurality of simulation testbench components, each of the at least one assigned unique type code to the associated simulation testbench component and the corresponding packet type from the plurality of packet types.

8. A system for generating a simulation timeline encoded packets view, the system comprising:

a processor; and a memory coupled to the processor, wherein the memory stores processor executable instructions, which, on execution, causes the processor to:

receive at least one type string from each of a plurality of simulation testbench components, wherein the type string corresponds to a packet type from a plurality of packet types;

assign a unique type code for each of the at least one type string received from each of the plurality of simulation testbench components based on the type string received from each of the plurality of simulation testbench components, wherein the type string comprises interface driver, interface monitor, expected stream output packet, actual stream output packet, and expected dropped packet, and wherein the unique type code corresponds to at least one of:

one of the plurality of simulation testbench components; and one of the plurality of packet types;

iteratively receive from at least one of the plurality of simulation testbench components, a plurality of data strings each with the corresponding assigned unique type code, wherein each of the plurality of data strings correspond to a packet and a packet type from the plurality of packet types;

receive a critical message from one or more of the plurality of simulation testbench components, wherein the critical message excludes the associated unique type code, and wherein the critical message comprises at least one of a reset event message, an error event message, a user-defined event message, or an end of simulation event message;

store each of the plurality of data strings marked with an associated receipt timestamp;

contemporaneously generate at each iteration a simulation timeline encoded packets view for each of the plurality of simulation testbench components based on the plurality of data strings, the marked receipt timestamps, and the assigned unique type codes; and contemporaneously render at each iteration the simulation timeline encoded packets view via a Graphical User Interface (GUI).

9. The system of claim 8, wherein a data string from the plurality of data strings comprises at least one of a string representation of the associated packet data, register address, or register data along with one of the unique type code assigned to a simulation testbench component from the plurality of simulation testbench components generating the data string from the plurality of data strings.

10. The system of claim 8, wherein the receipt timestamp for a data string from the plurality of data strings corresponds to a timestamp of receiving the data string by the packets plotter.

11. The system of claim 8, wherein, to store a data string from the plurality of data strings, the processor executable instructions further cause the processor to:

create a mapping between the data string, the associated receipt timestamp, and one of the unique type codes assigned to a simulation testbench component generating the data string.

12. The system of claim 11, wherein, to generate and render the simulation timeline encoded packets view on the GUI, the processor executable instructions further cause the processor to:

identify at least one unique type code assigned to each of the plurality of simulation testbench components and packet types;

extract the receipt timestamp associated with each of the plurality of data strings corresponding to each of the at least one unique type code; and plot a timeline of transactions corresponding to each of the plurality of simulation testbench components in the simulation timeline encoded packets view, based on the plurality of data strings, the identified unique type codes, and the extracted receipt timestamps.

13. The system of claim 8, wherein, to render the simulation timeline encoded packets view on the GUI, the processor executable instructions further cause the processor to:

present the critical message on the GUI corresponding to the receipt timestamp of the critical message.

14. The system of claim 8, wherein the processor executable instructions further cause the processor to:

send to each of the plurality of simulation testbench components, the at least one assigned unique type code; and map for each of the plurality of simulation testbench components, each of the at least one assigned unique type code to the associated simulation testbench component and the corresponding packet type from the plurality of packet types.

15. A graphical user interface (GUI) client for rendering a simulation timeline encoded packets view, the GUI client configured to:

receive a request from a user to render the simulation timeline encoded packets view for a simulation, wherein the simulation timeline encoded packet view comprises each of a plurality of simulation testbench components, a plurality of data strings received from each of the plurality of simulation testbench components, a marked receipt timestamp, and an assigned unique type code;

process the received request for generating the simulation timeline encoded packets view for the simulation; and contemporaneously render at each iteration to the user, the generated simulation timeline encoded packets view for the simulation.

16. A non-transitory computer-readable medium storing computer-executable instructions for generating a simulation timeline encoded packets view, the stored instructions, when executed by a processor, cause the processor to perform operations comprises:

receiving at least one type string from each of a plurality of simulation testbench components, wherein the type string corresponds to a packet type from a plurality of packet types;

assigning a unique type code for each of the at least one type string received from each of the plurality of simulation testbench components based on the type string received from each of the plurality of simulation testbench components, wherein the type string comprises interface driver, interface monitor, expected stream output packet, actual stream output packet, and expected dropped packet, and wherein the unique type code corresponds to at least one of:

one of the plurality of simulation testbench components; and one of the plurality of packet types;

iteratively receiving from at least one of the plurality of simulation testbench components, a plurality of data strings each with the corresponding assigned unique type code, wherein each of the plurality of data strings correspond to a packet and a packet type from the plurality of packet types;

receiving a critical message from one or more of the plurality of simulation testbench components, wherein the critical message excludes the associated unique type code, and wherein the critical message comprises at least one of a reset event message, an error event message, a user-defined event message, or an end of simulation event message;

storing each of the plurality of data strings marked with an associated receipt timestamp;

contemporaneously generating at each iteration, a simulation timeline encoded packets view for each of the plurality of simulation testbench components based on the plurality of data strings, the marked receipt timestamps, and the assigned unique type codes; and contemporaneously rendering at each iteration, the simulation timeline encoded packets view via a Graphical User Interface (GUI).

* * * * *